United States Patent Office 2,756,862
Patented July 31, 1956

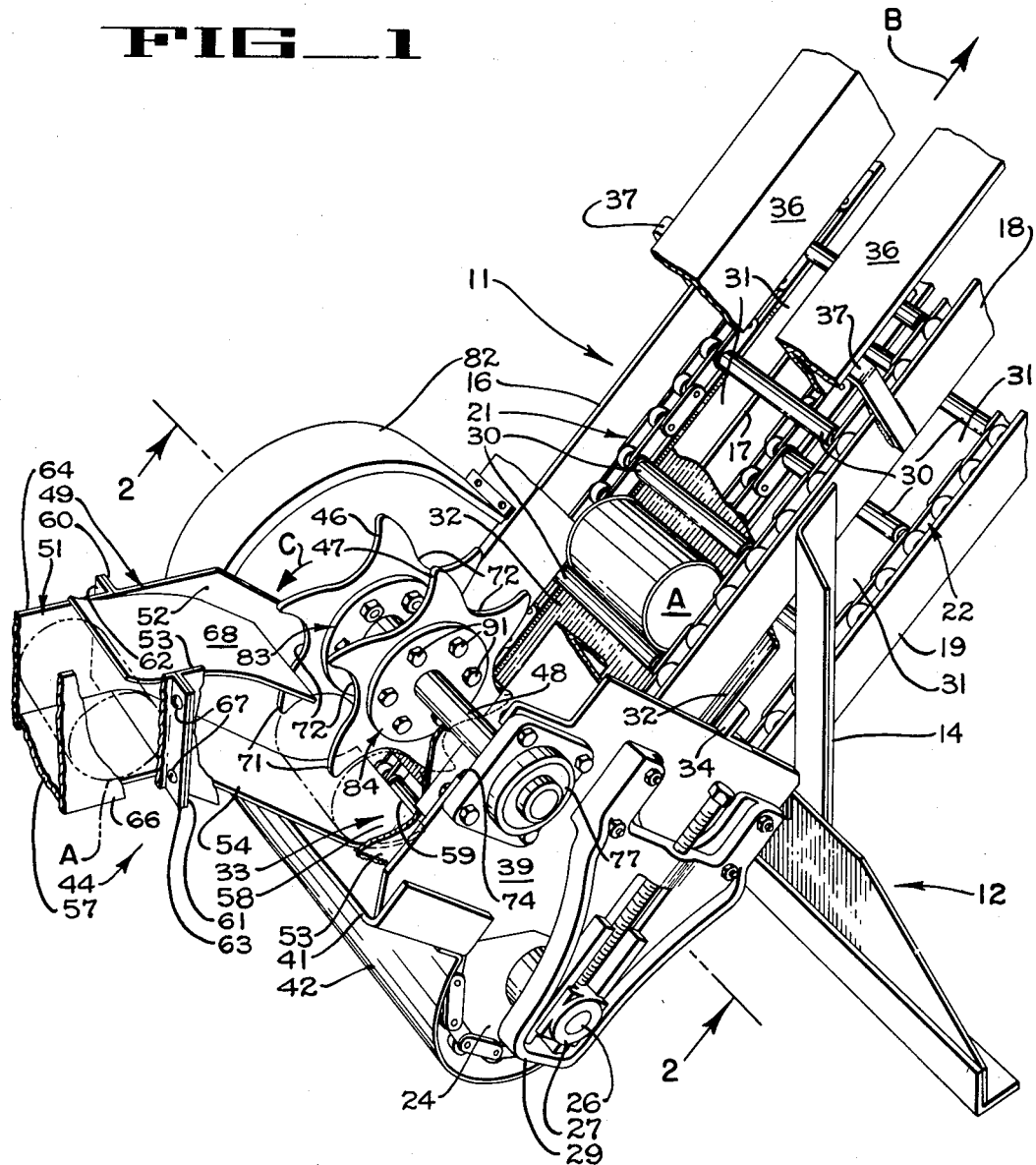

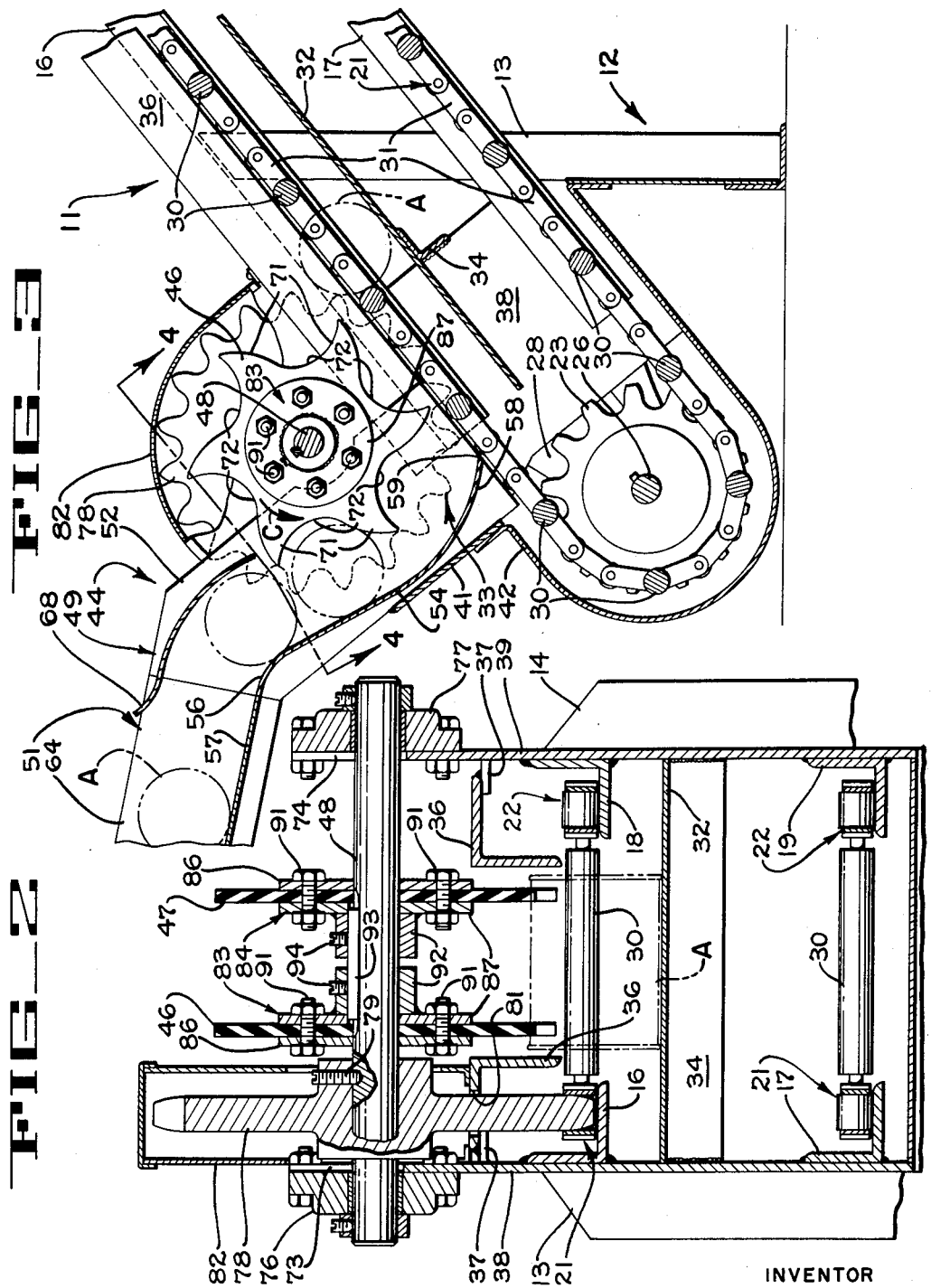

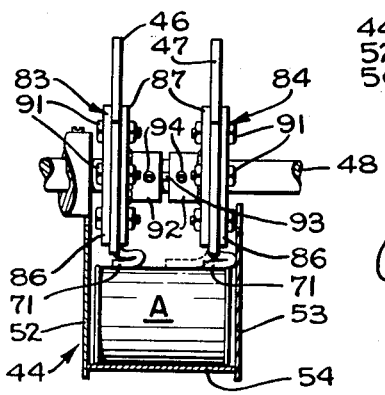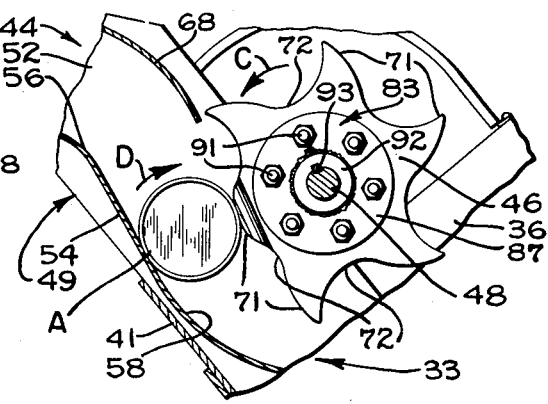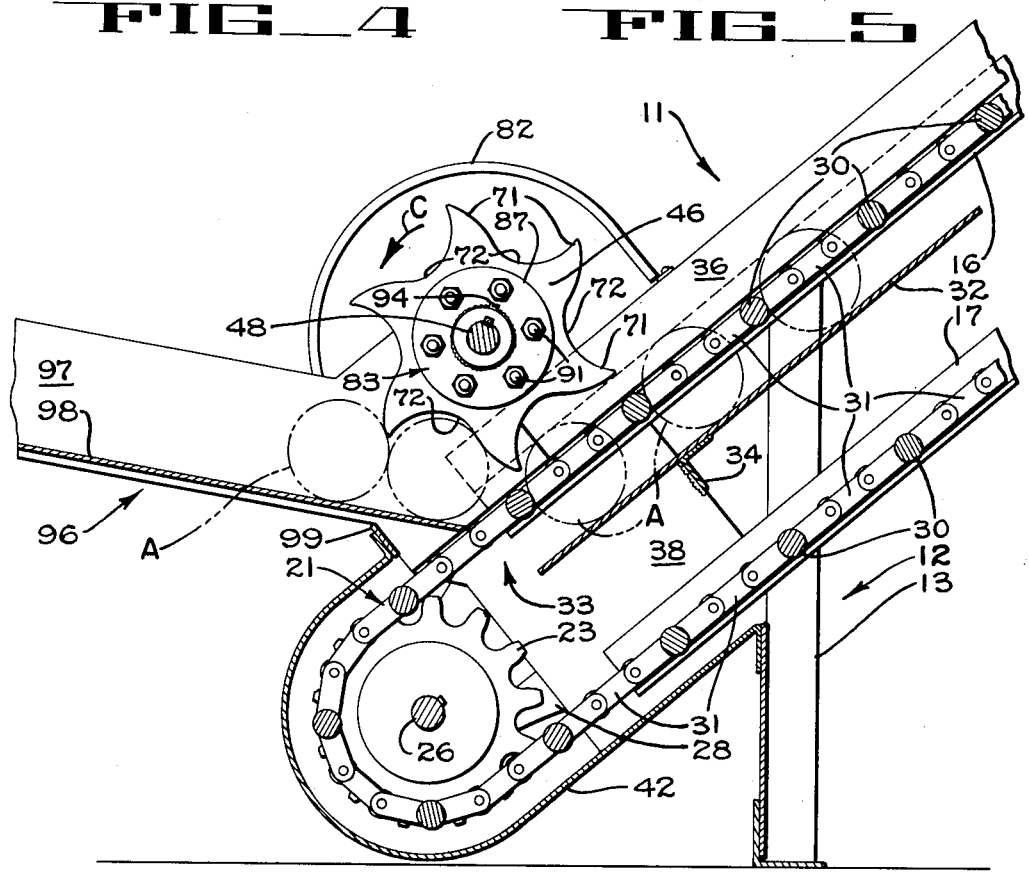

2,756,862

ARTICLE FEEDING MECHANISM

Sherman H. Creed, Campbell, Calif., assignor to Food Machinery and Chemical Corporation, San Jose, Calif., a corporation of Delaware Application February 18, 1952, Serial No. 272,081

3 Claims. (Cl. 198—26)

The present invention relates to an article feeding mechanism for the timed transfer of articles, such as cans, from one point to another.

One object of the present invention is to provide an article feeding mechanism that will not crush or dent articles entering the feeding mechanism out of time.

Another object is to provide an article feeding mechanism that is adapted to properly time rollable articles supplied to it at random.

Another object is to provide an article feeding mechanism of the type referred to that is absolutely reliable in operation.

Another object is to provide an article feeding mechanism that handles articles smoothly without jarring or shocking them.

Another object is to provide a simplified, durable, article feeding mechanism for furnishing articles to a timed article conveyor.

These and other objects and advantages of the present invention will become apparent from the following description and the accompanying drawings in which:

Fig. 1 is a fragmentary perspective view of a can elevator having an article feeding mechanism embodying the present invention associated therewith.

Fig. 2 is a transverse section on the line 2—2 of Fig. 1, certain parts being omitted.

Fig. 3 is a longitudinal vertical section of the mechanism shown in Fig. 1.

Fig. 4 is a section approximately on the line 4—4 of Fig. 3 showing a can which has entered the article feeding mechanism out of time.

Fig. 5 is a fragmentary section similar to Fig. 3 also showing a can which has entered the article feeding mechanism out of time.

Fig. 6 is a longitudinal vertical section of a modification of the present invention.

The lower portion of the can elevator 11 (Fig. 1) is supported by a stand 12 having two upright spaced angles 13 and 14 (Fig. 2) to which two pairs of vertically-spaced, parallel angle bars 16, 17 and 18, 19, respectively, are attached in an upwardly inclined position. The angles 16 and 17 act as supports for the upper and lower flights, respectively, of a continuous chain 21 and the angles 18 and 19 perform a similar function for a like chain 22 spaced from said chain 21 in a direction transversely of its direction of movement.

The elevator chains 21 and 22 are trained around sprockets 23 (Fig. 3) and 24 (Fig. 1), respectively, which are secured upon a rotatable shaft 26 journaled in bearing blocks 27 (only one being shown) held in a pair of adjustable bearing brackets 28 (Fig. 3) and 29 (Fig. 1). Said chains 21 and 22 are also trained around similar sprockets (not shown) mounted on a common drive shaft (also not shown) at the head or upper end of the elevator 11.

Cylindrical cross bars 30 (Figs. 1, 2 and 3) for elevating cans A are fastened between the chains 21 and 22 at equal intervals along their entire length thereby forming can receiving spaces 31 (Fig. 1) therebetween. A flat plate 32 is provided beneath the upper flights of said chains 21 and 22 to support the cans A supplied to the elevator 11. Said plate 32 extends longitudinally of the elevator 11 from its can feed station 33 (Fig. 3) at the lower end thereof to its discharge station (not shown) at the upper end thereof and said plate is supported by transverse angle bars 34 (only one being shown) arranged at intervals along the length of said elevator 11.

Actuation of the elevator drive shaft (not shown) at the head end of the elevator 11 results in the synchronous rotation of the chains 21 and 22, the upper flight of said chains moving upwardly over the plate 32 in the direction of the arrow B (Fig. 1) to effect the elevation of the cans A fed to the spaces 31 between the cylindrical pusher bars 30. A pair of angles 36 for guiding the cans A is supported above and laterally of the upper flight of the chains 21 and 22 by a series of paired L-straps 37, only one pair being shown, which are secured to the chain support bars 16 and 18.

The adjustable bearing brackets 28 and 29 are bolted to a pair of side plates 38 (Fig. 2) and 39 (Fig. 1), respectively, which are welded to the vertical legs of the chain support angles 16, 17 and 18, 19 (Fig. 2) respectively. The side plates 38 and 39 are laterally braced by a transverse strap 41 (Fig. 1) and one of the angle bars 34, and an arcuate guard plate 42 (Fig. 3) fastened at one end to said strap 41 and at the other end to the stand 12, encloses the sprockets 23 and 24 and the lower portions of the chains 21 and 22.

The cans A (Fig. 1) are supplied in timed relation to the elevator 11 at its feed station 33 by means of a chute 44 and a continuously moving gate mechanism comprising a pair of spaced timing star wheels 46 and 47 secured on a transverse shaft 48 rotatably supported above said feed station 33.

The chute 44 (Fig. 1) is formed in two sections, a can guiding section 49, and a can receiving section 51. The can guiding section 49 is positioned adjacent the left lower quadrant of the star wheels 46 and 47 (as viewed in Figure 3) and the side walls 52 and 53 of said section 49 straddle the star wheels and are arranged to guide the cans A between the can guide angles 36. The section 49 is secured to the elevator 11 by having its side walls 52 and 53 welded along their bottom margin to the strap 41.

Said can guiding section 49 has a steeply inclined floor plate 54 (Fig. 3) along which articles, such as the cans A, may roll. Said plate 54 is adapted to cause the cans A to approach and enter the star wheels 46 and 47 along a path substantially tangent to the path of said star wheels 46 and 47. The upper portion 56 of said plate 54 is curved to abut with the straight inclined floor 57 of the can receiving chute section 51. The lower portion 58 of said plate 54 is concentric with the star wheel shaft 48, and the lower edge 59 of said plate terminates just above the path of the pusher bars 30 at the elevator feed station 33.

The upper ends of the guiding section side plates 52 and 53 (Fig. 1) are bent outwardly to form flanges 60 and 61 and matching flanges 62 and 63 are formed on the adjacent ends of the receiving section side plates 64 and 66, respectively. The chute sections 49 and 51 are connected by securing the flanges 60 and 62, and 61 and 63 together by means of screw bolts 67 and a leg or other suitable brace member (not shown) may be provided at the opposite end of the can receiving chute 51 to aid in the support thereof. The upper of the chute 49 is provided with a curved plate 68 which is vertically spaced from the curved upper portion 56 of the floor plate 54 and is adapted to assure that the cans A supplied to the chute 44 follow the plate 54 and enter the star wheels 46 and 47 substantially tangent thereto.

The star wheels 46 and 47 (Fig. 1) are identical in shape and material, being formed with a plurality of equally-spaced, substantially-radial fingers 71 (Fig. 3) so shaped as to provide can-receiving pockets 72 therebetween. The star wheels 46, 47 (or at least their fingers 71) are made of a flexible, resilient material, such as rubber. Said fingers 71 are of a sufficient breadth that they are stiff in a direction tangent to their rotary path, thus enabling them to engage and control the movement of the cans A as they roll down the can guiding plate 54. The fingers 71, however, are thin enough that when an inward or compressive force is applied to their free ends, such as may occur during out of time meeting of said fingers and a mistimed can A rolling down the chute 44, said fingers 71 will deflect or buckle, as shown in Figs. 4 and 5.

The star wheel shaft 48 (Fig. 2) extends through opposed slots 73 and 74 in the side plates 38 and 39, respectively, and is journaled in bearings 76 and 77 bolted to the outer surface of said plates 38 and 39. A drive sprocket 78 is secured on said shaft 48 by means of a set screw 79 and said sprocket 78 meshes with the elevator chain 21 whereby the star wheels 46 and 47 are rotated in the direction of the arrow C (Figs. 1, 3, 5 and 6) in timed relation with said elevator 11, the pockets 72 of said star wheels successively registering with the spaces 31 between the pusher bars 30. A slot 81 (Fig. 2) is provided in the lower end of the left hand can guide angle 36 to accommodate the sprocket 78 and a guard housing 82 fastened to said left hand angle 36 encloses the upper portion of said sprocket 78.

The star wheels 46 and 47 (Fig. 2) are secured upon the shaft 48 in a spaced relation by means of identical mountings 83 and 84, respectively. Since the mountings 83 and 84 are identical, corresponding parts thereof have been given the same reference numeral. Said mountings comprise a pair of circular plates 86, 86 and 87, 87 between which the star wheels 46 and 47 are clamped by an annular series of screw bolts 91, 91 that extend through said star wheels and prevent them from rotating relatively to said mountings 83 and 84. The circular plates 87, 87 are provided with hubs 92, 92 and the mountings 83 and 84 are secured against rotation upon the shaft 48 by means of a key 93 which engages both hubs 92, 92. Said mountings 83 and 84 are restrained against longitudinal movement upon the shaft 48 by set screws 94, 94 provided in the hubs 92, 92. While the mountings 83 and 84 are identical, they are reversely mounted upon the shaft 48 with their hubs 92 adjacent to one another, so that both said mountings 83 and 84 may engage the same key 93 on the shaft 48 and with the fingers 71 and pockets 72 of the star wheels 46 and 47 held in exact register with each other as shown in Fig. 1.

In operation, with the star wheels 46 and 47 rotating in timed relation with the elevator 11, cans A are supplied by any desired means, to the can receiving section 51 (Figs. 1 and 3) of the chute 33 with their longitudinal axes transverse to said chute 44. Due to the declivity of the receiving section 51, the cans A roll down the floor plate 57 and into the can guiding chute section 49. After the cans A have entered the section 49, they accelerate rapidly due to the greater slope of the floor 54 of said section 49 and they roll down the section 49 and into the registering pockets 72 of the rotating star wheels 46 and 47. Any cans which might leave the floor 54 at its upper portion 56 where the inclination of said floor increases, are deflected downward into their proper path by the curved plate 68.

As previously pointed out, the cans A enter the star wheels 46 and 47 along a path that is substantially tangent to the path of said rotating wheels, thereby making the entry of the cans A into the pockets 72 of said wheels smooth and gentle without undue shock. After the cans A have been received in the pockets 72 of the star wheels 46 and 47 they are moved by the fingers 71 along the concentric portion 58 of the chute section 49 which guides the cans toward the elevator feed station 33. When a can A has been advanced past the edge 59 of the plate 54 it drops smoothly from its pocket 72 into a registering space 31 between the cylindrical bars 30 where it is pushed upwardly over the plate 32 by the trailing one of said bars 30.

Practically all of the cans A supplied to the chute 44 will roll freely and easily into the pockets 72 of the star wheels 46 and 47 even though they are supplied to said chute at random, nevertheless, a certain number of cans will enter the star wheels 46 and 47 out of time therewith, and will become jammed between the ends of the moving fingers 71 and the floor plate 54 rather than enter the pockets 72. However, since the fingers 71 are made of rubber, or other flexible material, and are relatively thin, they will eventually buckle laterally under the increasing compressive load applied to them (Figs. 4 and 5) as the rotation of the star wheels 46 and 47 urges the ends of the fingers 71 against the mistimed can.

In Fig. 4, both of the buckled star fingers 71 have been shown folded to the right of their normal projecting position (Fig. 2) but it should be understood that said fingers may fold either to the right or the left. Under certain conditions, for example, when the surface of the cans is oily, the fingers may not deflect as shown in full lines in Figs. 4 and 5, but may merely bend and slide laterally upon the surface of the cans into a position like that shown in dotted lines in Fig. 4.

The rubber, or other flexible material from which the fingers 71 are made should be such as to have a coefficient of friction with cans, or like articles, sufficient to prevent appreciable slippage between said buckled fingers 71 and the mistimed can. Similarly, the coefficient of friction between the cans, or like articles, and the floor 54 should also be large enough to prevent appreciable slippage therebetween. Hence, when an out of time can, such as the can A (Figs. 4 and 5) collides with and laterally buckles the aligned star wheel fingers 71, and thereby becomes wedged between the star wheels 46 and 47 and the floor 54, the rotation of the star wheels 46 and 47 in the direction of the arrow C (Fig. 5) will rotate said can in the direction of the arrow D (Fig. 5) and cause it to roll down the floor of the chute 44. As will be apparent from Fig. 5, while the mistimed can is rolled forwardly down the chute 44 by the rotating star wheels 46 and 47, it is rolled backwardly relative to said wheels 46 and 47, and will eventually be rolled off the buckled fingers 71 and seat itself in the pocket 72 succeeding the buckled fingers 71. Since the fingers 71 are made of a resilient material, they will immediately assume their normal unbuckled position (Figs. 2 and 3) after the mistimed can (Fig. 5) has been cleared from its jammed position. Thereupon the star wheels 46 and 47 will permit the now timed can to gravitate along the concentric portion 58 of the plate 54 and eventually feed it in timed relation to the elevator 11, as previously described.

A somewhat simpler feed chute construction may be used if desired and is illustrated in the modified embodiment shown in Fig. 6. In this construction, the feed chute member 96 comprises a spaced pair of walls 97 (only one being shown) provided with a straight inclined floor 98 ending adjacent the elevator feed station 33. The chute 96 is fastened to the frame structure of the elevator 11 adjacent the star wheels 46 and 47 by means of a transverse strap 99 welded to the chute walls 97 and to the elevator side plates 38 and 39. Said strap 99 is similar to the previously described strap 41 (Fig. 1) associated with the feed chute 44.

It will be noted that while the floor 98 (Fig. 6) of the feed chute 96 is adapted to feed cans A in a path tangent to that of the star wheels 46 and 47, in much the same manner as the chute 44, said floor 98 is inclined at a smaller angle than the floor 54 (Fig. 3) of the chute 44. Hence, the velocity of the cans A entering the star wheels 46 and 47 over the modified feed chute 96 is less than the velocity of the cans A fed to said star wheels by the chute 44 if the lengths of the two chutes are commensurate. It has been observed in test runs with both types of feed chutes that when cans are fed to the star wheels 46 and 47 using the feed chute 44 with its steeply inclined guiding floor 54 the number of times that cans contact the star wheels 46 and 47 out of time is considerably less than when the feed chute 96 is used. This difference in the number of cans contacting the wheels 46 and 47 out of time is believed to be attributable to the increased velocity with which the cans supplied by the chute 44 enter the star wheels 46 and 47, since the faster the cans approach said star wheels, the shorter is the time that they are in a possible interfering position with respect to the star wheel fingers 71. Thus, a smoother operation of the feeding device and an increase in the life of the rubber star wheels 46 and 47 is obtained through the use of the chute 44 with its sharply inclined guiding section 49.

While the devices disclosed in this application have their star wheel axes horizontal for the feeding of horizontally disposed cans, the invention embodied therein, and herein disclosed, is equally adaptable to embodiment in apparatus having a vertical axis star wheel such as might be used in conjunction with can fillers and other canning equipment which handle cans with their axes vertically positioned.

While I have described certain embodiments of the present invention, it will be understood, however, that various changes and modifications may be made in the details thereof without departing from the spirit and scope of the appended claims.

Having thus described the invention what I claim as new and desire to protect by Letters Patent is:

1. A mechanism for feeding and timing containers comprising an article guide member arranged to receive articles and guide them along a downwardly directed path, and a rotary timer mounted adjacent said guide member for rotation about an axis transverse to said downward path, said timer including circumferentially-spaced, outwardly-projecting fingers forming container receiving pockets therebetween, said fingers being movable in a rotary path converging with said downward path whereby to entercept containers moving along said downward path, each of said fingers being made of flexible resilient material and being proportioned to be sufficiently stiff in a direction tangent to said rotary path to intercept and slow down a container descending along said guide member and to be easily deflectable laterally of said path by a force applied radially inwardly to its free end.

2. A device for feeding a succession of articles to a moving conveyor having a succession of article-receiving spaces therein, comprising a chute adapted to support and guide the articles along a downwardly directed path at irregular intervals, a rotatable timer gate associated with said chute and arranged to receive articles therefrom and having a plurality of elongated, spaced fingers defining article-receiving pockets therebetween, each finger being movable into an article intercepting position across said chute to present a forward edge to an article passing through said intercepting position ahead of said finger and a rearward edge to an article arriving at said position after said finger, each of said fingers being constructed of flexible material and arranged to resist without bending a force against either of said edges and being arranged to buckle and assume a partially collapsed position under a force applied inwardly against the end surface of the finger by an article arriving at said position simultaneously with said finger, means rotatably mounting the timer gate adjacent said conveyor and for movement advancing the fingers therewith, and means for rotating the gate while maintaining a pocket thereof in register with one of the spaces of the conveyor long enough for transfer of an article from said pocket to said space.

3. A mechanism for feeding and timing containers comprising an article guide member arranged to receive articles and guide them along a downwardly directed path, a rotary article feeding and timing device mounted adjacent said guide member for rotation about an axis transverse to said downward path, said device comprising a shaft having a pair of discs secured in axially spaced relation thereon, each disc having a generally circular central body portion and a predetermined number of circumferentially spaced fingers movable in a rotary path, the fingers of one disc being disposed in alignment axially of said shaft with the fingers of the other disc whereby said discs cooperate to define a plurality of circumferentially spaced pockets each of which is adapted to receive a cylindrical container, each of said fingers being substantially rigid in a direction tangent to said rotary path and having a yieldable end portion adapted to be deflected out of said path by a force applied radially inwardly of the outer end of said finger.

References Cited in the file of this patent

UNITED STATES PATENTS

| | | |
|---|---|---|
| 2,176,557 | Lippold | Oct. 17, 1939 |
| 2,283,615 | Skinner et al. | May 19, 1942 |
| 2,387,211 | Barnby et al. | Oct. 16, 1945 |
| 2,524,248 | Albertoli | Oct. 3, 1950 |